US010899093B2

(12) United States Patent
Chaturvedi

(10) Patent No.: US 10,899,093 B2
(45) Date of Patent: Jan. 26, 2021

(54) FRESNEL LENS ON FLEXIBLE SUBSTRATE FOR PACKAGING AND OTHER APPLICATIONS AND PROCESS THEREFOR

(71) Applicant: Ashok Chaturvedi, New Delhi (IN)

(72) Inventor: Ashok Chaturvedi, New Delhi (IN)

( * ) Notice: Subject to any disclaimer, the term of this patent is extended or adjusted under 35 U.S.C. 154(b) by 0 days.

(21) Appl. No.: 15/540,222

(22) PCT Filed: Jan. 18, 2016

(86) PCT No.: PCT/IN2016/000018
§ 371 (c)(1),
(2) Date: Jun. 27, 2017

(87) PCT Pub. No.: WO2016/116945
PCT Pub. Date: Jul. 28, 2016

(65) Prior Publication Data
US 2018/0257323 A1     Sep. 13, 2018

(30) Foreign Application Priority Data

Jan. 19, 2015   (IN) .......................... IN157/DEL/2015

(51) Int. Cl.
*B29D 11/00*     (2006.01)
*B41M 3/00*     (2006.01)
(Continued)

(52) U.S. Cl.
CPC .. *B29D 11/00269* (2013.01); *B29D 11/00288* (2013.01); *B29D 11/00298* (2013.01);
(Continued)

(58) Field of Classification Search
CPC ... G02B 3/00; G02B 3/08; G02B 5/08; G02B 5/09; G02B 27/12; B42D 25/328;
(Continued)

(56) References Cited

U.S. PATENT DOCUMENTS

| 5,695,346 A | 12/1997 | Sekiguchi et al. |
| 2005/0095407 A1 | 5/2005 | Coburn, Jr. |

(Continued)

FOREIGN PATENT DOCUMENTS

| WO | 2005/106601 A2 | 11/2005 |
| WO | 2006/075053 A1 | 7/2006 |
| WO | 2013/030780 A1 | 3/2013 |

OTHER PUBLICATIONS

European Patent Office, International Search Report and Written Opinion issued in corresponding Application No. PCT/IN2016/000018, dated Jul. 26, 2016.

*Primary Examiner* — Jie Lei
(74) *Attorney, Agent, or Firm* — Dinsmore & Shohl, LLP

(57) ABSTRACT

The present invention provides processes (100, 200, 300, 400) for making a flexible packaging substrate having one or more Fresnel lenses (410, 602) and a product made therefrom. The said process comprises providing one or more Fresnel lenses (410, 602) on a first surface (408a, 610a) of a substrate/film (408, 610); and overlapping a predetermined portion (411, 603) of the Fresnel lenses (410, 602) on the substrate/film (408, 610) by printing or foil stamping. The flexible packaging substrate having one or more Fresnel lenses comprises a substrate (408) having the Fresnel lens or the pattern of Fresnel lenses (410) on the first surface (408a) thereof, wherein a predetermined portion (411) of the Fresnel lenses (410) is covered to hide irregular/uneven/torn edges.

27 Claims, 11 Drawing Sheets

(51) Int. Cl.
    *B42D 25/351* (2014.01)
    *B42D 25/324* (2014.01)
    *B42D 25/328* (2014.01)
    *B42D 25/44* (2014.01)
    *B44F 1/04* (2006.01)
    *G02B 3/08* (2006.01)
    *C08C 1/15* (2006.01)
    *C08L 7/02* (2006.01)
    *C08C 1/04* (2006.01)
    *B41M 3/06* (2006.01)

(52) U.S. Cl.
    CPC ............ *B41M 3/003* (2013.01); *B41M 3/008* (2013.01); *B42D 25/324* (2014.10); *B42D 25/328* (2014.10); *B42D 25/351* (2014.10); *B42D 25/44* (2014.10); *B44F 1/045* (2013.01); *C08C 1/04* (2013.01); *C08C 1/15* (2013.01); *C08L 7/02* (2013.01); *G02B 3/08* (2013.01); *B41M 3/06* (2013.01)

(58) Field of Classification Search
    CPC .... B42D 25/324; B42D 25/351; B42D 25/44; B29D 11/00269; B29D 11/00298; B29D 11/00288; B41M 3/003; B41M 3/008; B41M 3/06; B44F 1/045; C08C 1/04; C08C 1/15; C08L 7/02
    USPC ....... 359/742, 743, 565, 566, 576, 627, 838; 427/162, 164, 256
    See application file for complete search history.

(56) References Cited

U.S. PATENT DOCUMENTS

| | | | |
|---|---|---|---|
| 2009/0034082 A1* | 2/2009 | Commander | .......... B41M 3/148 359/619 |
| 2014/0247499 A1* | 9/2014 | Doublet | ............... G02B 3/0037 359/627 |

* cited by examiner

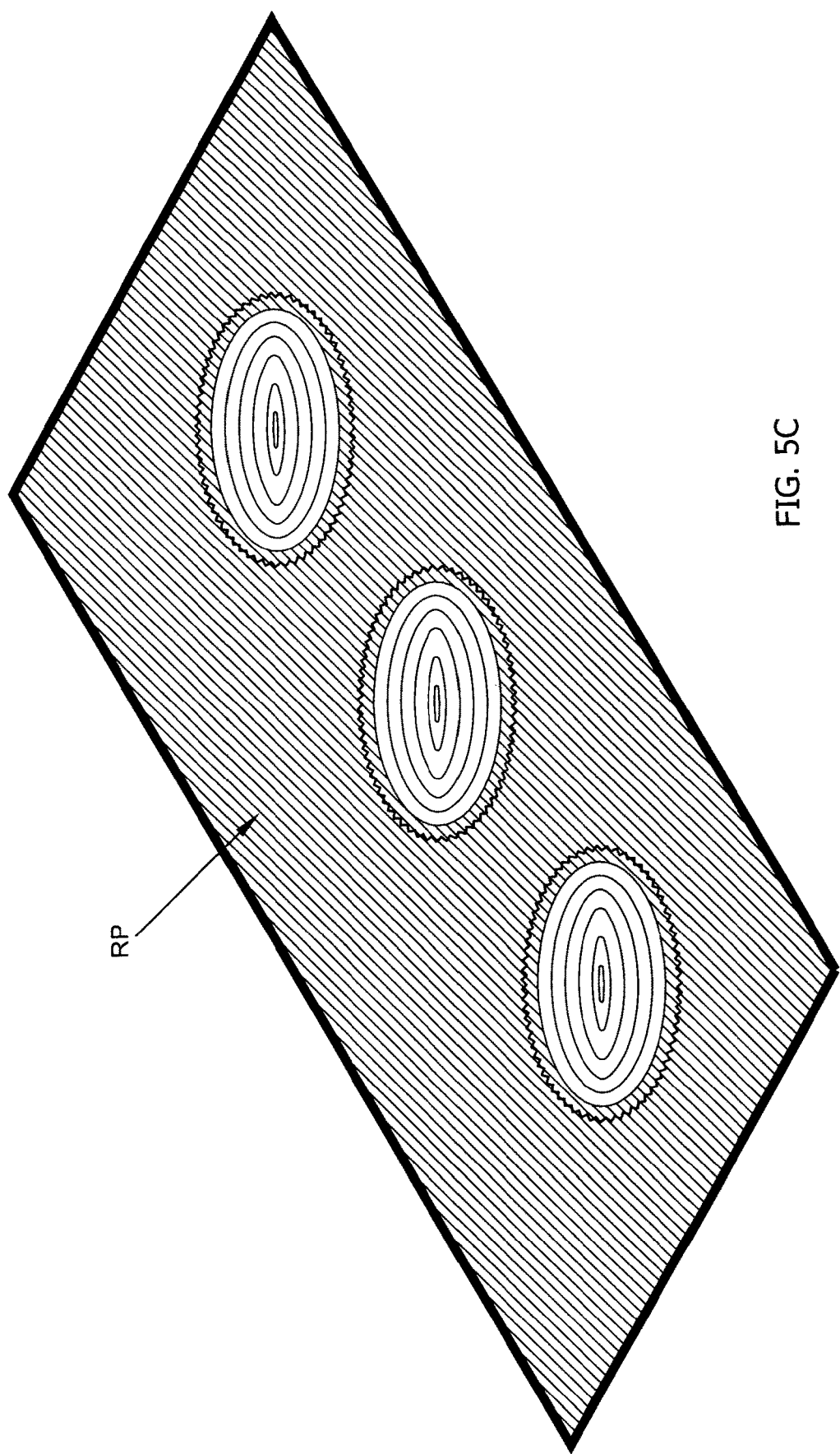

FRESNEL LENS ON FLEXIBLE SUBSTRATE FOR PACKAGING AND OTHER APPLICATIONS AND PROCESS THEREFOR

CROSS-REFERENCES TO RELATED APPLICATIONS

This application is a national-phase entry under 35 U.S.C. § 371 of International Application No. PCT/IN2016/000018, filed Jan. 18, 2016, which claims the benefit of priority to Indian Patent Application No. 157/DEL/2015, filed Jan. 19, 2015.

FIELD OF THE PRESENT INVENTION

The present invention generally relates to flexible substrates for packaging and other applications and more particularly to flexible substrates having Fresnel lens.

BACKGROUND

In today's competitive consumer market, decorative packaging has become very important and is used as a marketing tool to attract the attention of potential shoppers. The use of films/laminates with Fresnel lens in packaging provides a unique experience to the consumer in the shopping area when someone moves between the package with Fresnel lens and the buyer, the package appears to be moving even though the buyer is standing still. This attracts the buyer towards the product.

It is known in the art to create or transfer Fresnel lenses on a film and metalize or back the film with a light reflecting surface. Such Fresnel lens films are known to be used for packaging to make them more attractive. Further, it is desired and well known in the art to incorporate such Fresnel lenses by hot or cold lamination of a film having Fresnel lens to another substrate such as another polymeric film, or fibrous substrates such as paper, or paper board.

It is also known in the art to laminate such films with Fresnel lens to fibrous substrates such as paper, paperboards in order to achieve Fresnel lens on packaging cartons, boxes, Bags & Sachets etc. Subsequently, surface printing is done on the laminate over the outer surface of the film. This surface printing is prone to wear and tear and is not rub-resistant.

While incorporating Fresnel lenses using any of the methods described above or any other method known in the art, it has been observed that the edges of the Fresnel lenses so incorporated appear to be irregular and don't look sharp.

Further, it is desired that the Fresnel lenses are incorporated in the form of a pattern or an array of small Fresnel lenses. The small Fresnel lenses in the array may be circular, triangular, star-shaped or any other geometrical shape or pattern. It has been observed that the smaller and more intricate is the pattern of the small Fresnel lenses, more is the tendency of tearing of the edges of the Fresnel lenses transferred on the desired substrate. Similarly, there are more chances of irregular edges even around single lens when the torn edges of the lens falls over the Fresnel lens embossing however, the edges may be irregular otherwise also. This happens when the stamping foil with lenses or array of Fresnel lens is removed off the desired substrate after hot/cold stamping. Similar occurrence of irregular/uneven edges is also observed when creating the Fresnel lenses by UV/E-beam cast and cure method.

Further, it is desired that the methods of incorporating Fresnel lenses on substrates should be simpler, efficient, and cost-effective, allowing easier further processing.

Therefore, there is a need for providing a method for making a decorative substrate with Fresnel lens, increasing the aesthetic value of the packaging which obviates the disadvantages of the prior art. There is a need in the art to provide a substrate with Fresnel lens and a method for making the same, which addresses the problem of irregular or torn edges around the Fresnel lens.

Also, it should be possible to use the substrate for other various applications such as wall papers, floor coverings, apparels, etc. and incorporate an effective security/anti-counterfeit feature in addition to the Fresnel lens without compromising on the appearance of the lens when viewed through a naked eye.

BRIEF DESCRIPTION OF THE DRAWINGS

FIGS. 5A-5C illustrate a pictorial representation of a process of providing a flexible packaging substrate having Fresnel lenses with well-defined edges, in accordance with another embodiment of the present invention.

Like reference numerals refer to like parts throughout the description of several views of the drawings.

DETAILED DESCRIPTION OF THE INVENTION

For a thorough understanding of the present invention, reference is made to the following detailed description in connection with the abovementioned drawings. Although the present invention is described with reference to exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the present invention. Further, it will nevertheless be understood that no limitation in the scope of the invention is thereby intended, such alterations and further modifications in the figures and such further applications of the principles of the invention as illustrated herein being contemplated as would normally occur to one skilled in the art to which the invention relates. Also, it is to be understood that the phraseology and terminology used herein is for the purpose of description and should not be regarded as limiting. Further, reference herein to "one embodiment" or "an embodiment" means that a particular feature, characteristic, or function described in connection with the embodiment is included in at least one embodiment of the invention. Furthermore, the appearances of such phrase at various places herein are not necessarily all referring to the same embodiment. The terms "a" and "an" herein do not denote a limitation of quantity, but rather denote the presence of at least one of the referenced item.

Figure 1:
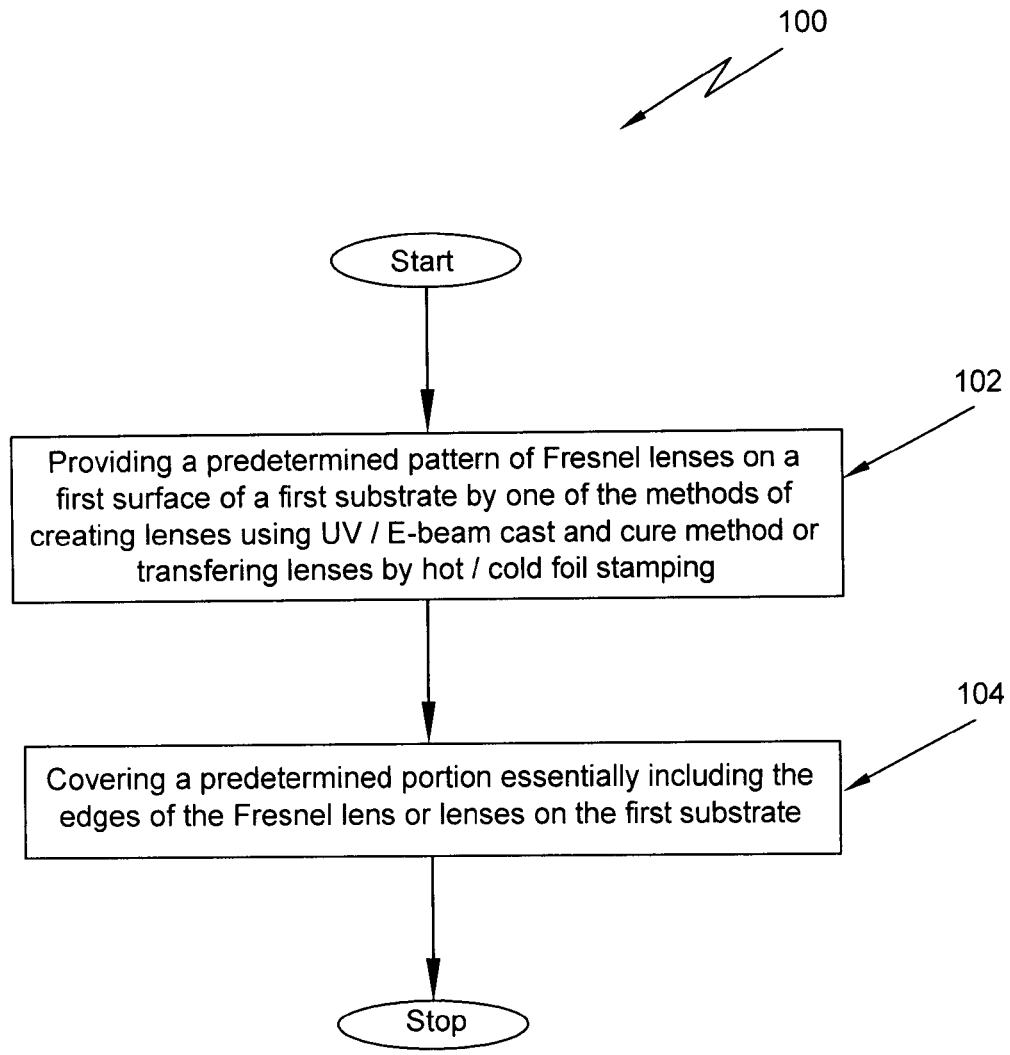
FIGS. 1-4 illustrate exemplary flowcharts depicting processes for making a flexible substrate with Fresnel lenses with well-defined edges, for packaging and other applications in accordance with different embodiments of the present invention.

Accordingly, various embodiments of the present invention provide a flexible substrate, hereinafter referred to as the substrate having a Fresnel lens or a pattern of Fresnel lenses with well-defined edges, and processes for making the same. The following detailed description is provided with reference to FIGS. 1-7E which may be cross-referenced for the explanation purposes. In an embodiment of the invention, a process 100 as shown in FIG. 1 for making a substrate with Fresnel lenses for packaging and other applications includes the following steps:

Step 102: providing one or more Fresnel lenses (410, 602), or a pattern of Fresnel lenses (410, 602), hereinafter interchangeably referred to as the Fresnel lens or the Fresnel lenses or the pattern of Fresnel lenses (410, 602). The Fresnel lenses (410) are provided on a first surface (408a, 610a) of a substrate (408, 610) by using UV/E-beam cast and cure method or by hot or cold foil stamping process. In an embodiment, the substrate (408) may be at least one of a suitable single or multilayer fibrous substrate such as paper or paperboard, which may be coated or uncoated, woven or non-woven substrate of manmade fibers of natural or polymeric origin, film of PET or BOPP or any other suitable polymer or laminate. In another embodiment the paper may be selected from, but not limited to, bank cheque paper, currency paper, bond paper, book paper, kraft paper, wall paper, cotton paper, fish paper, inkjet paper, laid paper, leather paper, washi, wove paper. It may be contemplated that the term substrate may comprise, but not limited to, a roll of substrate or an individual substrate sheet. Further, it may be contemplated that the one or more Fresnel lenses may be provided on the substrate in roll form or individual substrate sheet in a predetermined pattern. The said predetermined pattern of Fresnel lenses on the substrate roll may include:

(a) a predetermined row of the Fresnel lenses wherein the Fresnel lenses are located at predefined locations on the substrate from roll of substrate. The locations of the Fresnel lenses in row are shown in FIG. 7A as an exemplary embodiment of the present invention;

(b) a predetermined array of the Fresnel lenses wherein the Fresnel lenses are located at predefined locations on the substrate from roll of substrate. The array of the Fresnel lenses is shown in FIG. 7B as an exemplary embodiment of the present invention; and (c) a predefined group or cluster of the Fresnel lenses. The said group or cluster may comprise a predetermined number of the Fresnel lenses and predefined shape and size of the Fresnel lenses. The shape or the size of one or more Fresnel lenses provided in the group may be identical or different from one another. The group may be located at predetermined locations on the roll. The group or cluster of Fresnel lenses on the substrate roll is shown in FIG. 7C as an exemplary embodiment of the present invention.

In case of individual substrate sheets, the pattern of the Fresnel lenses may include:

(a) a predetermined array of the Fresnel lenses wherein the said Fresnel lenses are provided at predefined locations on the individual substrate sheet. The array of the Fresnel lenses on the individual substrate sheet is shown in FIG. 7D as an exemplary embodiment of the present invention; and (b) a predefined group or cluster of the Fresnel lenses. The said group or cluster may comprise a predetermined number of the Fresnel lenses and predefined shape and size of the Fresnel lenses. The shape or the size of one or more Fresnel lenses provided in the group may be identical or different from one another. The group may be located at predetermined locations on the substrate sheet. The group or cluster of Fresnel lenses on the substrate sheet is shown in FIG. 7E as an exemplary embodiment of the present invention.

Step 104: covering a predetermined portion (411, 603) of the Fresnel lenses (410, 602), provided on the substrate (408, 610). The predetermined portion (411, 603) of the Fresnel lenses (410, 602) essentially includes the edge(s) (410a, 602a) of the Fresnel lenses (410, 602). The edge(s) (410a, 602a) referred herein may be edges as shown in FIGS. 7A-7E which are described in detail hereinafter. The edges (410a, 602a) of the Fresnel lenses (410, 602) may be uneven, irregular or torn. To cover the predetermined portion (411, 603) of the Fresnel lenses (410, 602) on the substrate (408, 610), transparent windows (512, 612) or one or more predetermined shapes or an array of predetermined shapes (412), hereinafter interchangeably referred to as the predetermined shape or the predetermined shapes or the array of predetermined shapes (412), are provided on the substrate (408, 610), which overlaps the predetermined portion (411, 603) of the Fresnel lenses (410, 602). In an embodiment, the predetermined portion (411, 603) of the Fresnel lenses (410, 602) is determined such that a substantial portion of the Fresnel lens (410, 602) is left visible. The width of the predetermined shape (412) and/or size of the transparent windows (512, 612) is designed such that it covers the predetermined portion (411, 603) of the Fresnel Lens (410, 602) essentially including the edges (410a), such that a desired portion of the Fresnel Lens (410, 602) is visible. The predetermined shapes (412) or transparent windows (512, 612) may also be selected such that the visible portion of the Fresnel lens (410, 602) is having predetermined shapes such as circular, star, elliptical, square, or any other geometrical shape or a combination thereof. The overlapping of the predetermined portion (411, 603) may be achieved by predetermined shape (412) obtained by printing or transfer by cold/hot foil stamping or by laminating the first surface (408a) of the substrate (408) having Fresnel lenses (410), with a transparent film (510) having reverse printing left with portions of unprinted transparent windows (512) of predetermined shape and size or by creating or transferring Fresnel lens (610) over the transparent windows (612) on the reverse printed polymeric transparent film (610).

The shape and size of the transparent windows (512, 612) on the reverse printed polymeric transparent film (610) are designed such that the area surrounding the transparent windows overlaps at least the predetermined portion (411, 603) of the Fresnel lens (410, 602). The area outside the periphery of the transparent windows is opaque being reverse printed thus hiding the edges (410a, 602a)

Figure 2:
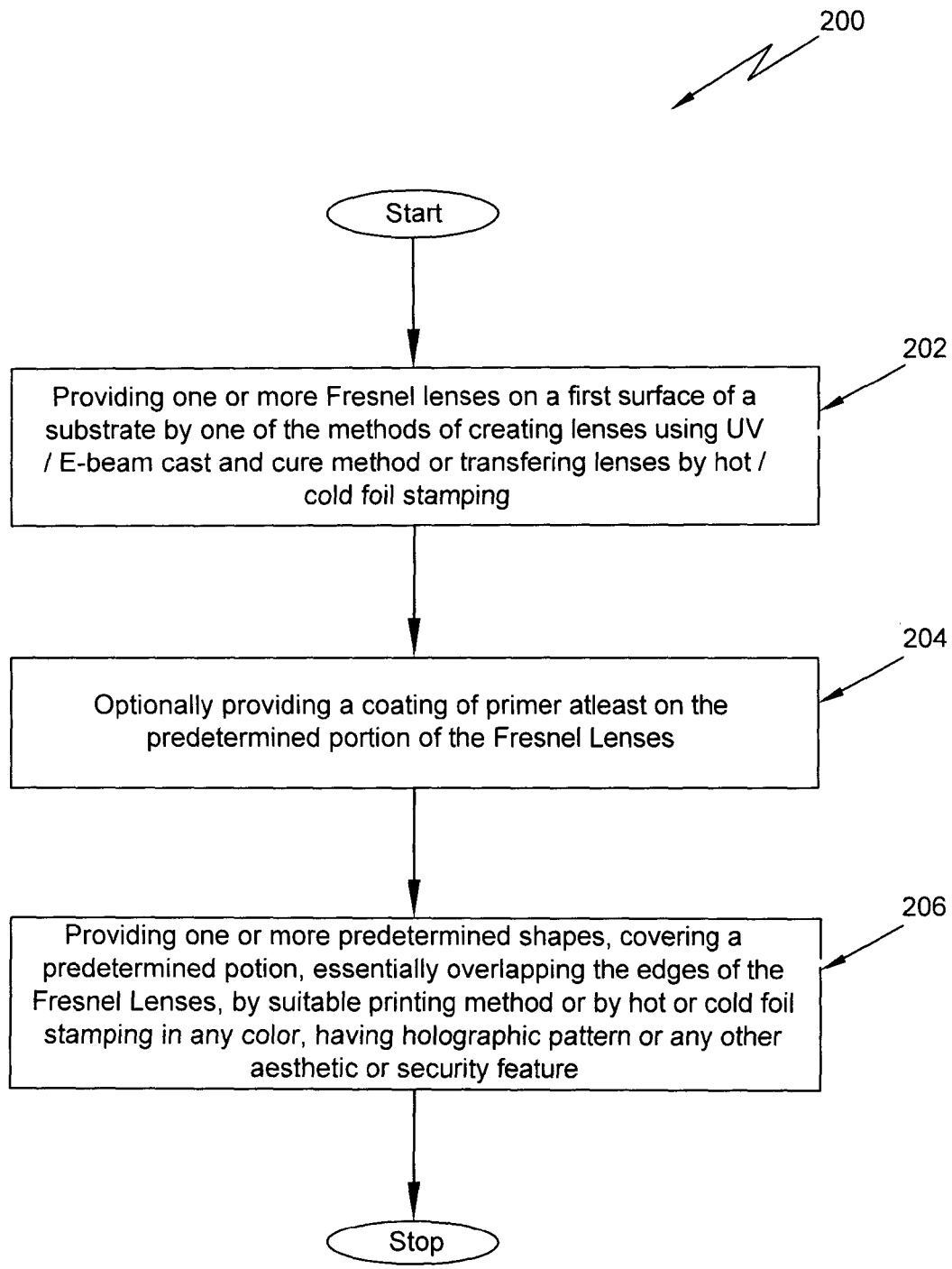

In an embodiment of the invention, shown as process 200 in FIG. 2, at step 202, the Fresnel lenses (410) are configured on the first surface (408a) of the substrate (408) by using UV/E-beam cast and cure method or by transferring by hot/cold foil stamping process.

In the cast and cure method the substrate is coated on the first surface (408a) of with a curable coating being capable of curing using a radiation. Fresnel lenses are provided by embossing on the curable coated substrate and then the coating is cured using radiation. It is appreciated that the different coating may be used depending upon the radiation used in curing them.

Optionally, at step 204, to improve the adhesion of predetermined shape (412), which is to be achieved by printing or foil stamping, on the predetermined portion (411) and/or first surface (408*a*), a coating of primer may be applied at least on the predetermined portion (411) which is subsequently covered by the predetermined shape (412) or on whole of the first surface (408*a*) of the substrate (408) excluding a substantial surface of the Fresnel lenses (410). For example the substantial surface may be defined as a maximum visible area of Fresnel lens (410) surrounded by typically 0.5 mm to 2 mm wide predetermined portion (411), coated with primer.

At step 206, one or more predetermined shapes (412) are provided, overlapping the predetermined portion (411) of the Fresnel lens (410). For example, the predetermined shapes (412) may be provided by using suitable printing method by letterpress, offset, rotogravure, flexographic, digital, laser or screen printing or by hot or cold foil stamping in any color, holographic pattern, engraved pattern or having any other security feature like latent image or a combination thereof. It may be contemplated that the hologram or holographic pattern, engraved pattern or any security feature such as latent image (416) or in combination thereof may be provided on the Fresnel lens (410) and/or on the first surface (408*a*) of the substrate (408) at predetermined location(s).

In an alternate embodiment, the predetermined shapes (412) may be replaced with all over surface printing on the first surface (408*a*) of the substrate (408) leaving unprinted windows over the Fresnel lenses (410). The size of the unprinted windows are designed slightly smaller than the size of the Fresnel lenses (410) thereby overlapping the predetermined portion (411).

Figure 4:
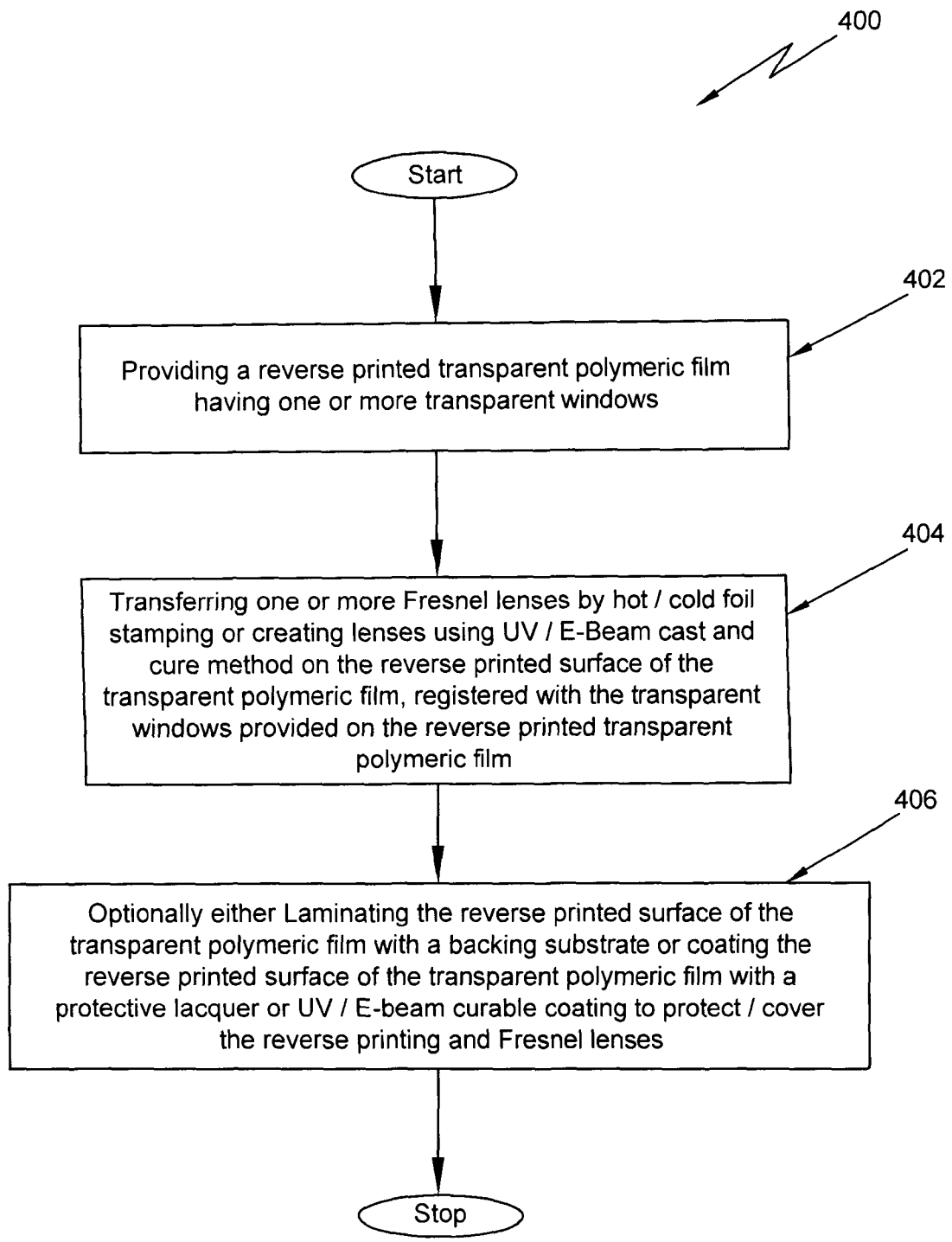
Figure 4A:
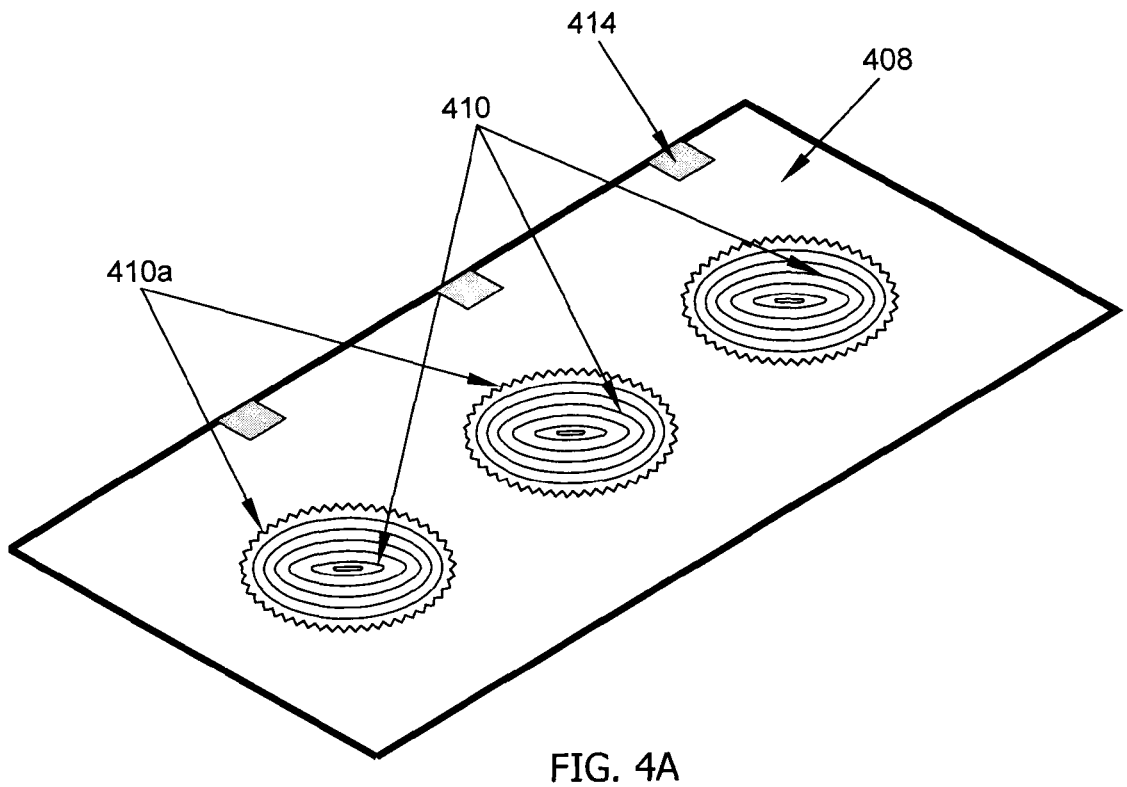
FIGS. 4A-4B illustrate a pictorial representation of a process of providing a flexible packaging substrate having Fresnel lenses with well-defined edges, in accordance with an embodiment of the present invention.
Figure 4B:
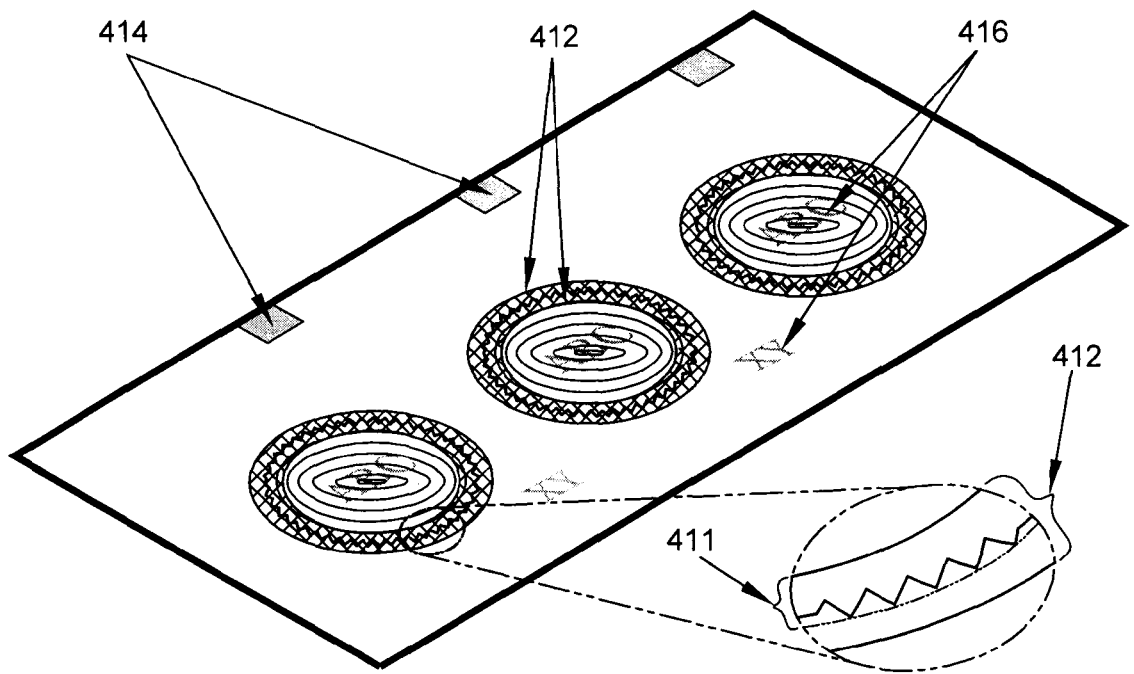

In an exemplary embodiment, the predetermined shape (412) may be a ring (412) as shown in FIG. 4B. In various other embodiments, the predetermined shape (412) may be any other geometrical shape such as star, rectangular, elliptical, polygonal or any other regular/irregular shapes.

It may be contemplated that the substrate (408) with Fresnel lenses (410) obtained by the process 200, as described above is surface printed around the Fresnel lenses (410) on the first surface (408*a*) or reverse printed on a second surface (408*b*) excluding Fresnel lenses (410).

Figure 3:
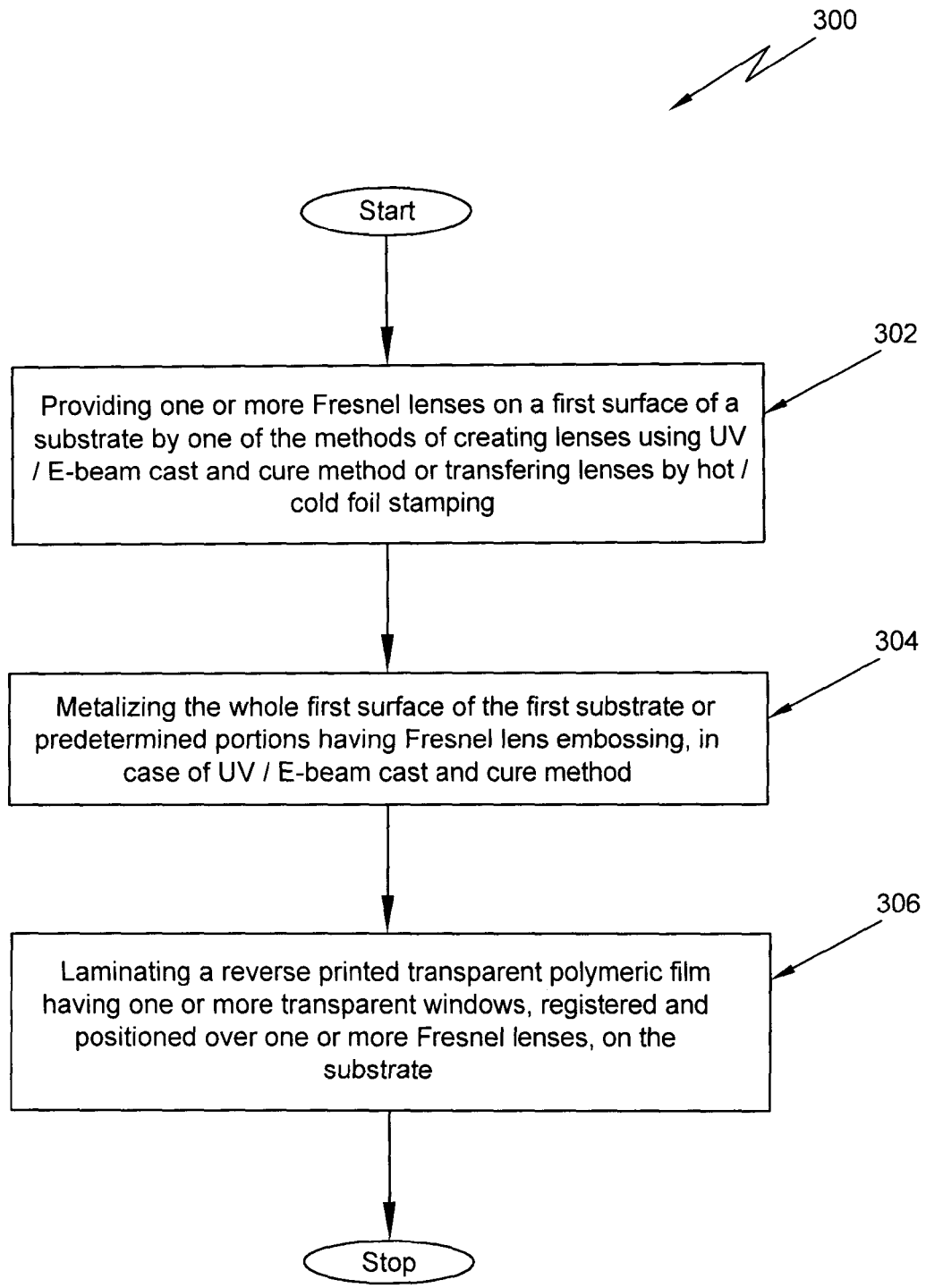

In another embodiment of the invention, shown as process 300 in FIG. 3, at step 302, the pattern of Fresnel lenses (410) is provided on the first surface (408*a*) of the substrate (408) by one of the methods of creating lenses by UV/E-beam cast and cure method or transferring lenses by hot/cold foil stamping. It may be apparent that a pattern of Fresnel lenses (410) may include a single lens as well.

Further, at step 304, in case of Fresnel lens (410) created by the UV/E-beam cast and cure method, the Fresnel lens (410) may be selectively metalized after creation thereof. In case of the Fresnel lens (410) transferred by the hot/cold foil stamping, the Fresnel lenses (410) may be pre-metalized. In an embodiment, a portion of the first surface (408*a*) or the whole first surface (408*a*) of the substrate (408) may be metalized. The metalized surface may be optionally provided with holograms or holographic pattern, engraved patterns or latent image (416) at predetermined locations or all over the first surface (408*a*). The first surface (408*a*) of the substrate (408) which is duly metalized excluding Fresnel lenses, (410) is selectively de-metalized. The substrate (408) may be metalized with one chosen from the group consisting of aluminum, nickel, copper, Zinc Sulphide, Silicon Oxide, Aluminum Oxide or one or more of Silver, Gold, Copper or Chrome or any such suitable metal or its compound or combination thereof.

Figure 5A:
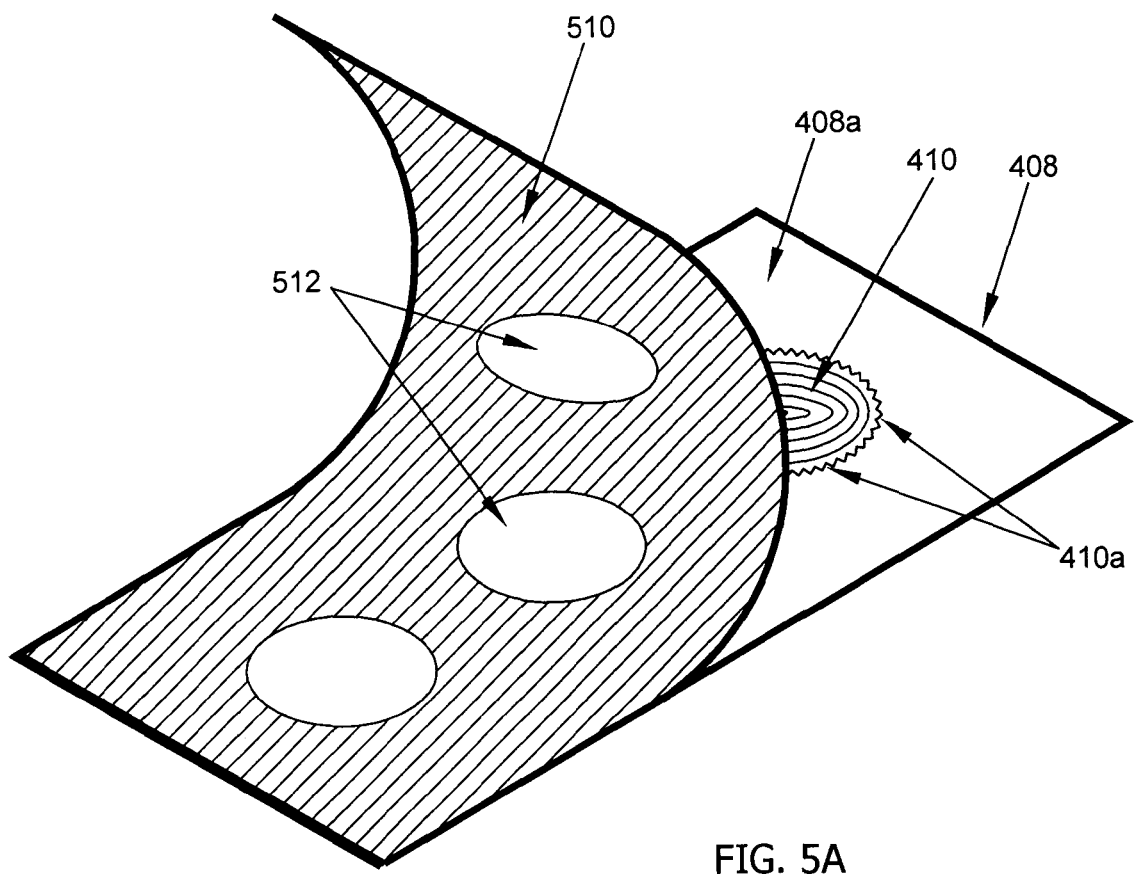
Figure 5B:
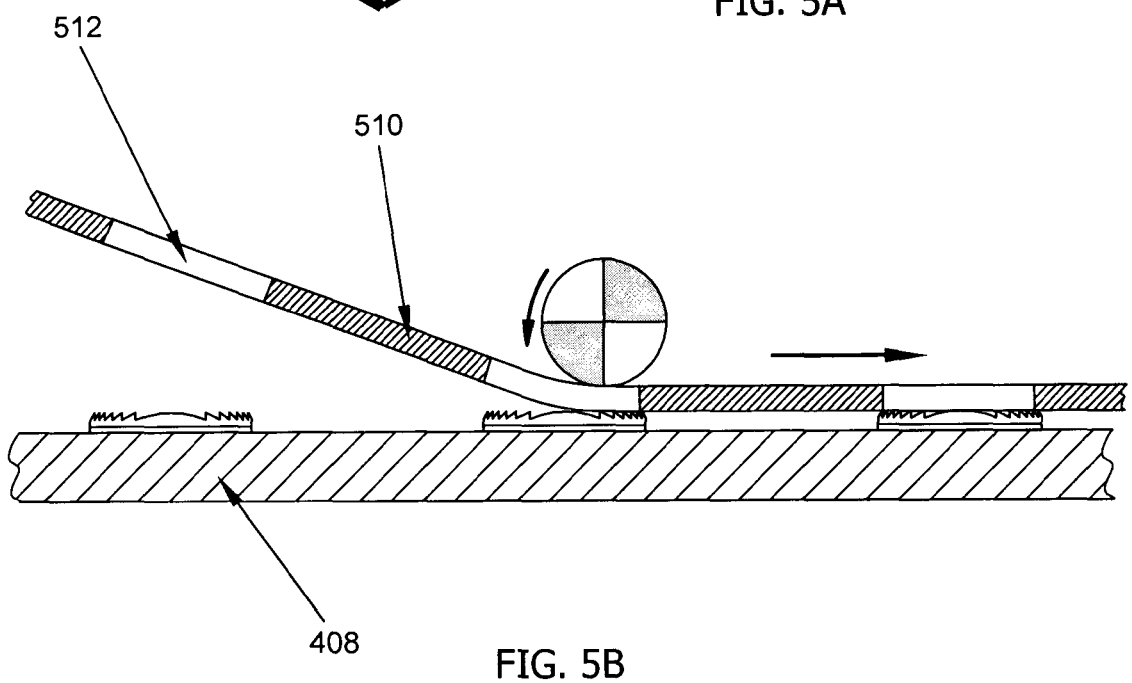

At step 306, the predetermined portion (411) of the Fresnel lenses (410) on the substrate (408), is covered by laminating a reverse printed transparent polymeric film (510) having one or more unprinted transparent windows (512), or predetermined pattern of unprinted transparent windows (512), hereinafter interchangeably referred to as the unprinted transparent window or the unprinted transparent windows, or the transparent window(s) or the predetermined pattern of the unprinted transparent window or predetermined array of the unprinted transparent windows, registered with and positioned over the Fresnel lenses (410) on the substrate (408), as shown in FIGS. 5A, 5B and 5C. In an embodiment the reverse printed transparent polymeric film (510) may be a single or multilayer polymeric film made up of one of Polyethylene (PE), Polypropylene (PP), Polyvinyl Chloride (PVC), Poly Carbonate (PC), Polyethylene Terephthalate (PET), Polyamide (PA) and Ethylene Vinyl Acetate (EVA) or a combination thereof. The overlapping of the predetermined portion (411) is achieved by keeping the size of the transparent window (512) smaller than the size of Fresnel lens (410), as shown in FIGS. 5A & 5B.

It may be contemplated that the substrate with Fresnel lenses (410) obtained by process 300, as described above may be used as it is or may be further laminated with other film or substrate to make various products like pouches, bags, sachets, display boards, wall/floor coverings, squeeze tubes of laminates and many other goods for packaging and other applications.

In yet another embodiment of the invention, shown as process 400 in FIG. 4 in conjunction with FIG. 6A-E, at step 402, a reverse printed transparent polymeric film (610) having one or more unprinted transparent windows (612), or predetermined pattern of unprinted transparent windows (612), hereinafter interchangeably referred to as the unprinted transparent window or the unprinted transparent windows, or the transparent window(s) or the predetermined pattern of the unprinted transparent window or predetermined array of the unprinted transparent windows, is provided. In an embodiment, the reverse printed transparent polymeric film (610) may be a single or multilayer polymeric film and can be made up of one of Polyethylene (PE), Polypropylene (PP), Polyvinyl Chloride (PVC), Poly Carbonate (PC), Polyethylene Terephthalate (PET), Polyamide (PA), Acrylonitrile Butadiene Styrene (ABS), and Ethylene Vinyl Acetate (EVA) or a combination thereof.

At step 404, the pattern of Fresnel lenses (602) is transferred by hot I cold foil stamping or created by UV/E-beam cast and cure method over and duly registered with the transparent windows (612), on the first surface (610*a*) of the reverse printed transparent polymeric film (610). In an embodiment, size of the Fresnel lenses (602) is larger than that of the transparent windows (612), such that the reverse printed area surrounding the transparent windows overlaps/covers at least the predetermined portion (603) of the Fresnel lenses (602).

At step 406, optionally a backing substrate (620), is laminated with the reverse printed transparent polymeric film (610) to protect/cover the reverse printing and the Fresnel lenses (602).

In an embodiment, the backing substrate (620) may be at least one of a suitable single or multilayer fibrous substrate such as paper or paperboard, which may be coated or uncoated, woven or non-woven substrate of manmade fibers of natural or polymeric origin, film of PE, PET or BOPP or any other suitable polymer or laminate. In another embodiment the paper may be selected from, but not limited to, bank cheque paper, currency paper, bond paper, book paper, kraft paper, wall paper, cotton paper, fish paper, inkjet paper, laid paper, leather paper, washi, wove paper.

Alternatively, a protective lacquer or UV/E-beam curable coating may be provided instead of backing substrate (620), to protect/cover the reverse printing and Fresnel lenses (602).

It may be contemplated that the substrate with Fresnel lenses (602) obtained by process 400, as described above may be used as it is or may further laminated with other film or substrate to make various products like pouches, bags, sachets, display boards, wall/floor coverings, squeeze tubes of laminates and many other goods for packaging and other applications.

With reference to process 200 in FIG. 2 and as shown in FIGS. 4A-4B, the flexible packaging substrate (408) has the pattern of Fresnel lenses (410) with irregular edges (410a), and the predetermined shapes (412) covering the predetermined portion (411) of the Fresnel lenses (410). In a preferred embodiment, the predetermined portion (411) essentially consists of the irregular edges (410a) which may be uneven, irregular or torn.

The predetermined shapes (412) are configured to cover at least the predetermined portion (411) of the Fresnel lenses (410) on the substrate (408). For example, the predetermined shape is a ring (412) covering the irregular edges (410a) on the circumference of the circular Fresnel lenses (410) as shown in FIG. 4B.

In an embodiment, the predetermined shape (412) is provided by hot or cold foil stamping on the substrate (408). The stamping foil may have metalized holograms, or engraved pattern or Solid color/metallic color with or without pattern or any other type of aesthetic/security enhancing means or combination thereof. In the example illustrated in the FIG. 4B, the rings (412) are shown as array of predefined shapes (412) configured by printing or hot/cold foil stamping.

In an embodiment, the pattern of Fresnel lenses (410) is configured on the first surface (408a) of the substrate (408) by using UV/E-beam cast and cure method or by transferring by hot or cold foil stamping process, registered with respect to marks (414) on the substrate (408) as shown in FIG. 4A. Then the array of predetermined shapes (412) is configured registered with respect to marks (414) so that the predetermined shapes (412) are positioned over the predetermined portion (411) of the Fresnel lenses (410) on the first surface (408a) of the substrate (408) as shown in FIG. 4B. However, the predetermined shapes (412) may be registered with respect to Fresnel lenses (410) on the substrate (408).

In an embodiment, the Fresnel lenses (410) configured by using UV/E-beam cast and cure method are metalized with one of Aluminum, Nickel, Copper, Zinc Sulphide, Silicon Oxide, Aluminum Oxide or one or more of Silver, Gold, Copper or Chrome or any other suitable metal or its compound or combination thereof. The Fresnel lenses (410) may be selectively metalized or the whole first surface (408a) of the substrate (408) may be metalized.

Holography can be embossed on the portions of metalized first surface (408a) not having Fresnel lenses (410) or other printing or hot or cold foil stamping.

The portions of metalized first surface (408a) excluding Fresnel lenses (410) or other printing or hot/cold foil stamping can be provided with text, numerals, mark or combination thereof by selective demetallization using various methods known in the art.

As an additional security feature, a latent image (416) may be configured over the Fresnel lens (410) surface and/or the portions of metalized first surface (408a) excluding Fresnel lenses (410) or other printing or hot/cold foil stamping. The latent image (416) may be visible under UV light or through polarizer or any other means.

In reference to process 300 in FIG. 3 and FIG. 5A, the first surface (408a) of the substrate (408), having the pattern of Fresnel lenses (410), configured using UV/E-beam cast and cure method or by hot or cold foil stamping process is shown. The reverse printed transparent polymeric film (510), having the predetermined array of unprinted transparent windows (512) is laminated with the first surface (408a) of the substrate (408) such that the transparent windows (512) are registered with and positioned over the Fresnel lenses (410) on the first surface (408a) of the substrate (408) as shown in FIG. 5B, according to an alternate embodiment of the present invention. The size of the transparent windows (512) is designed smaller than the Fresnel lenses (410) to ensure that the irregular edges (410a) of the Fresnel lens (410) are covered by the reverse printed (RP) opaque surroundings of the transparent windows (512) as shown in FIG. 5C.

Figure 6A:
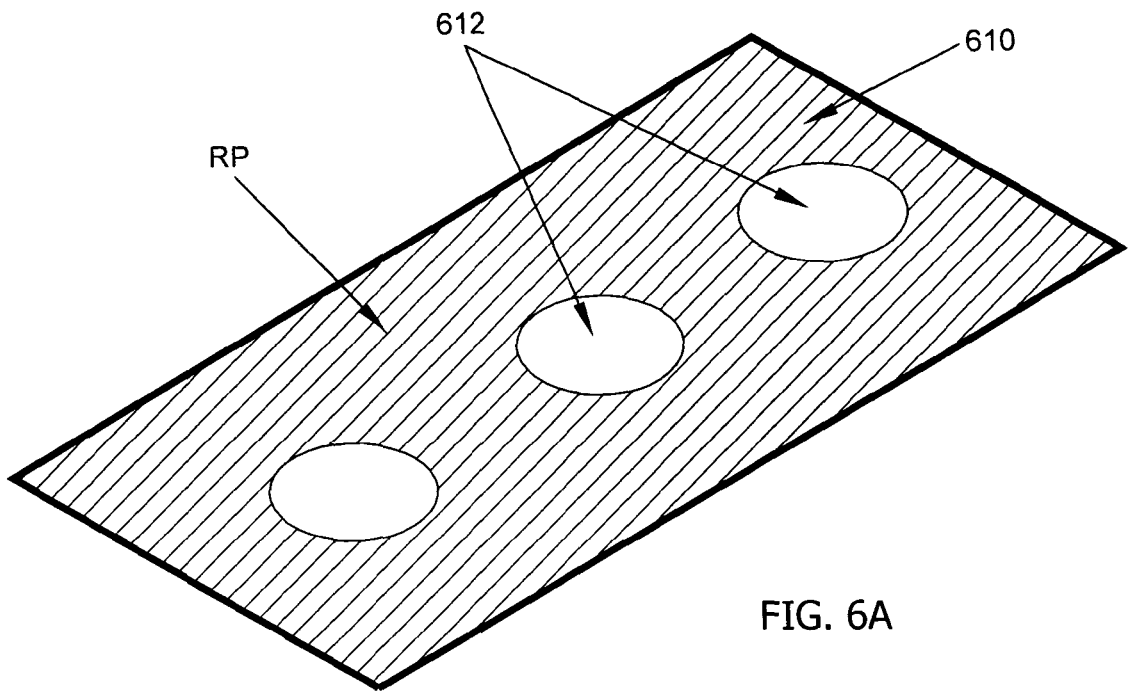
FIGS. 6A-6E illustrate a pictorial representation of the process of providing a flexible packaging substrate having Fresnel lenses with well-defined edges, in accordance with yet another embodiment of the present invention.

In reference to process 400 in FIG. 4 and as shown in FIG. 6A, the first surface (610a) of the transparent polymeric film (610) is reverse printed (RP) having the predetermined pattern of unprinted transparent windows (612).

Figure 6B:
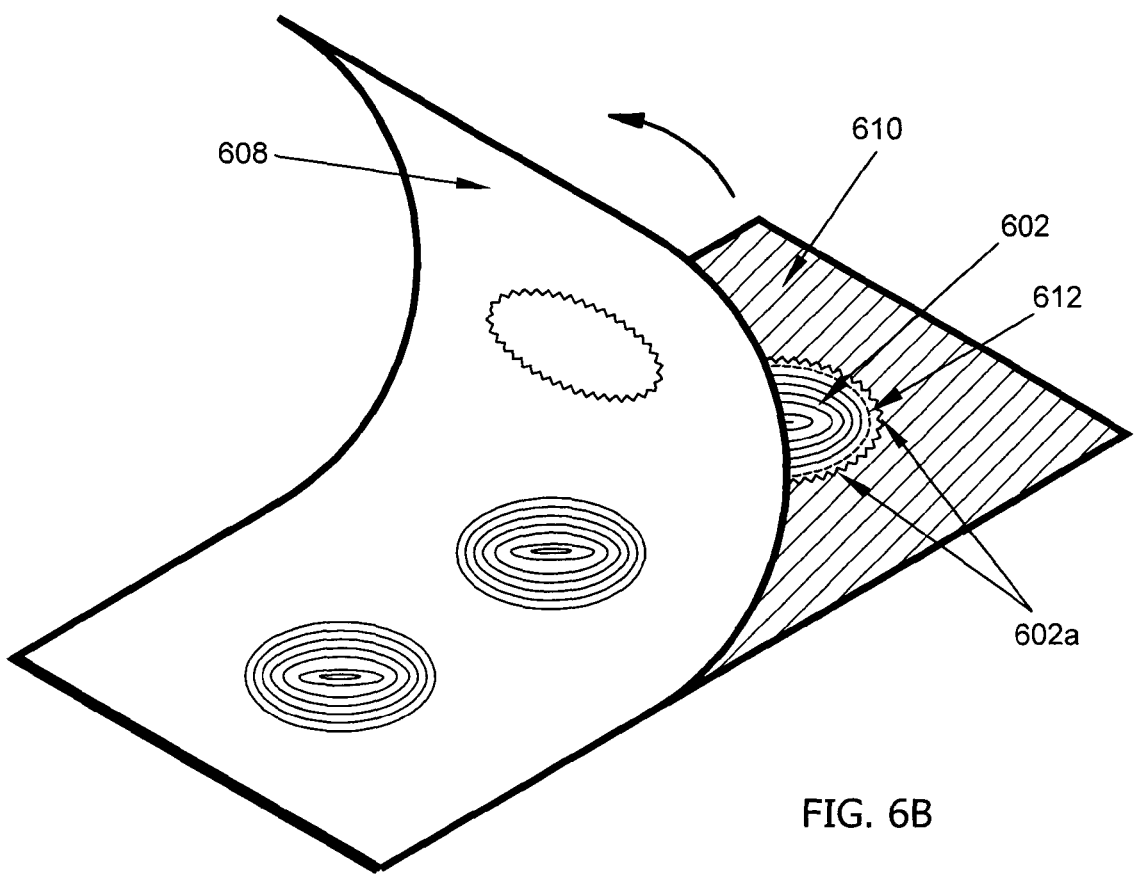
Figure 6C:
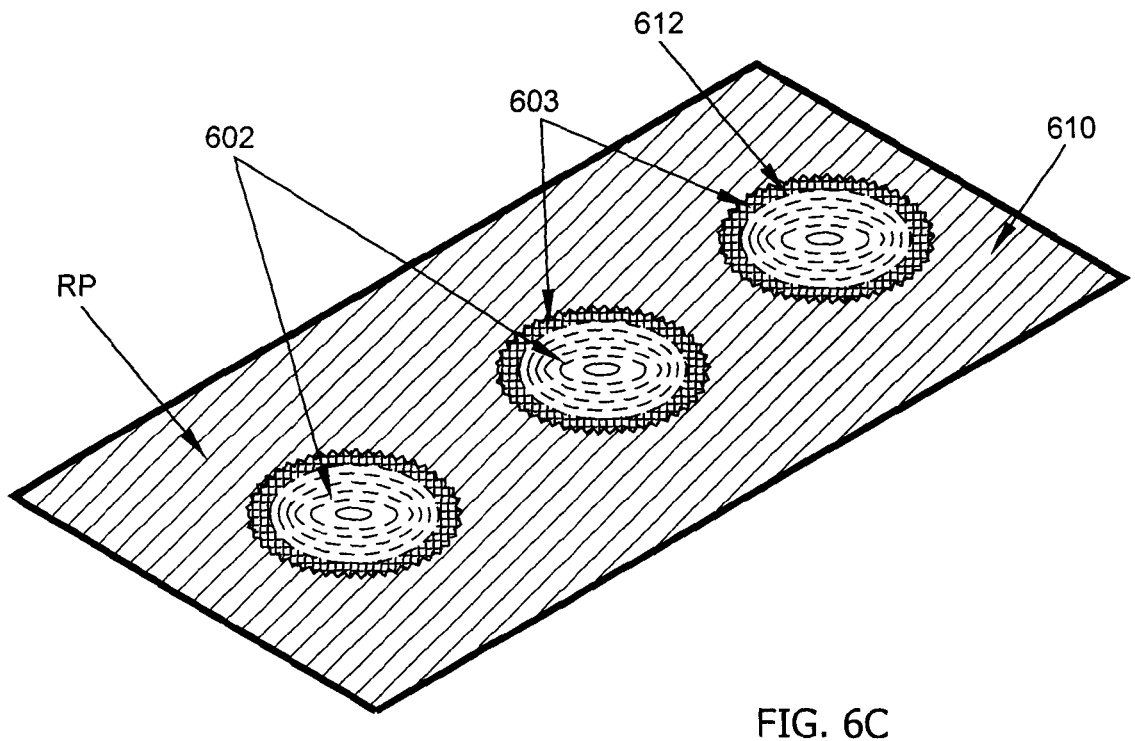

Fresnel lenses (602) are subsequently configured on the first surface (610a) either by using UV/E-beam cast and cure method or by hot or cold foil stamping process, registered with and positioned over the transparent windows (612) on the first surface (610a) according to another alternate embodiment of the present invention. Transfer of Fresnel lenses (602) by foil stamping using a foil stamping sheet (608) as an exemplary embodiment is shown in FIG. 6B. The Fresnel lens (602) has the shape and size slightly larger than the corresponding transparent window (612) as shown in FIGS. 6B-6C. The Fresnel Lenses (602) are configured registered with respect to the corresponding transparent windows (612) or a mark. The means for registration may be marks on the reverse printed transparent polymeric film (610) or punchings on the film or the transparent windows (612) or any suitable reference available.

Figure 6D:
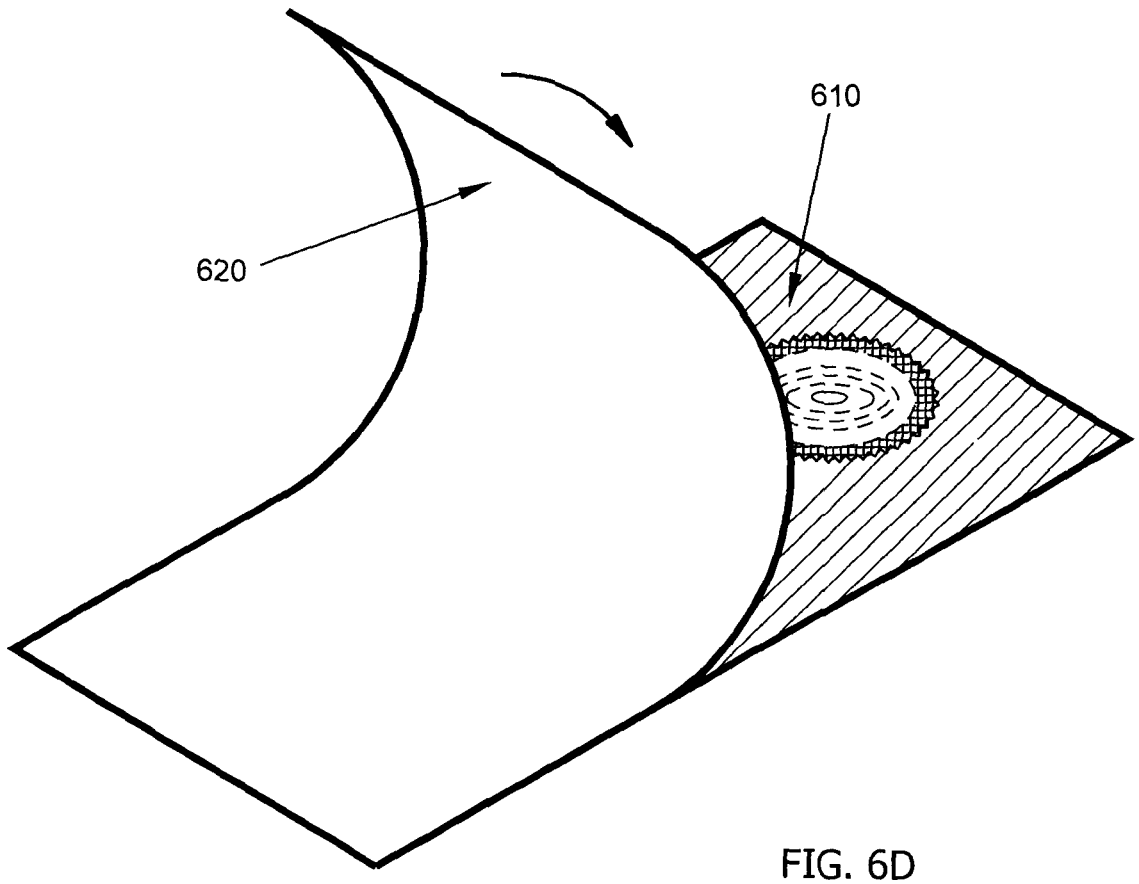
Figure 6E:
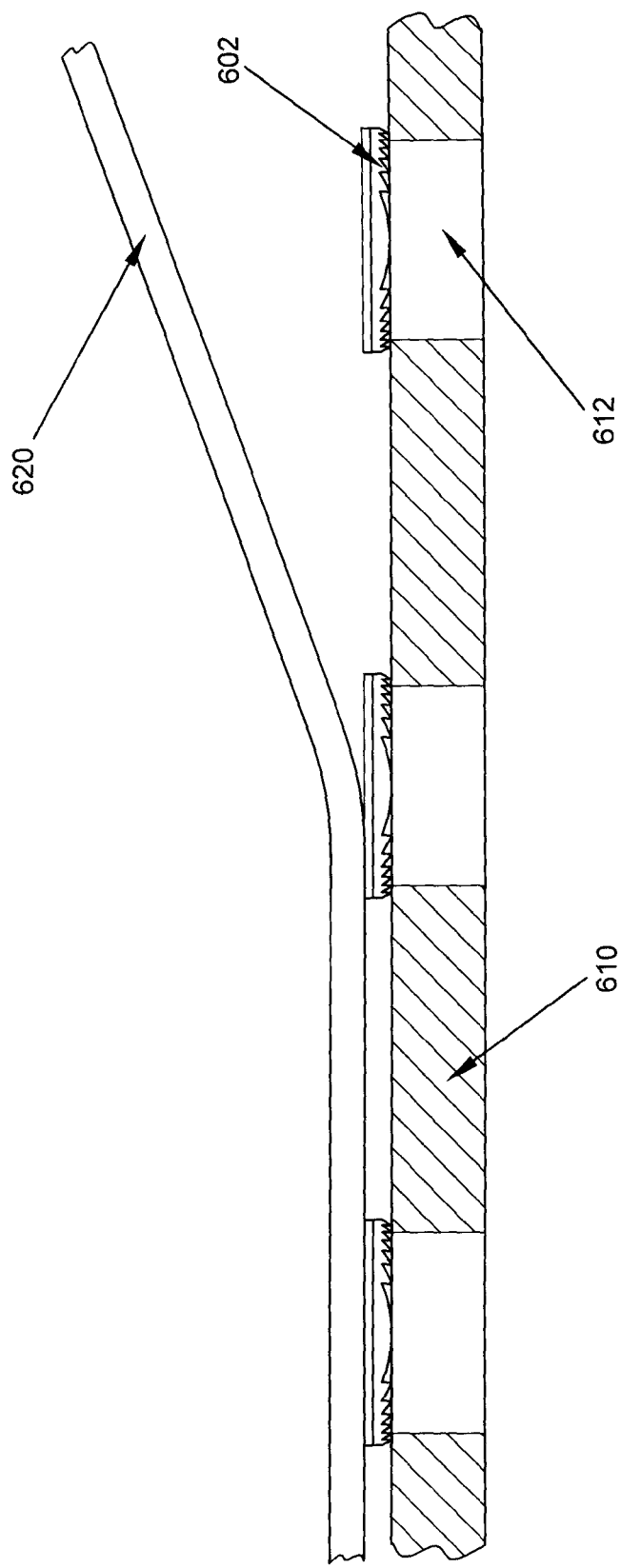
Figure 7:
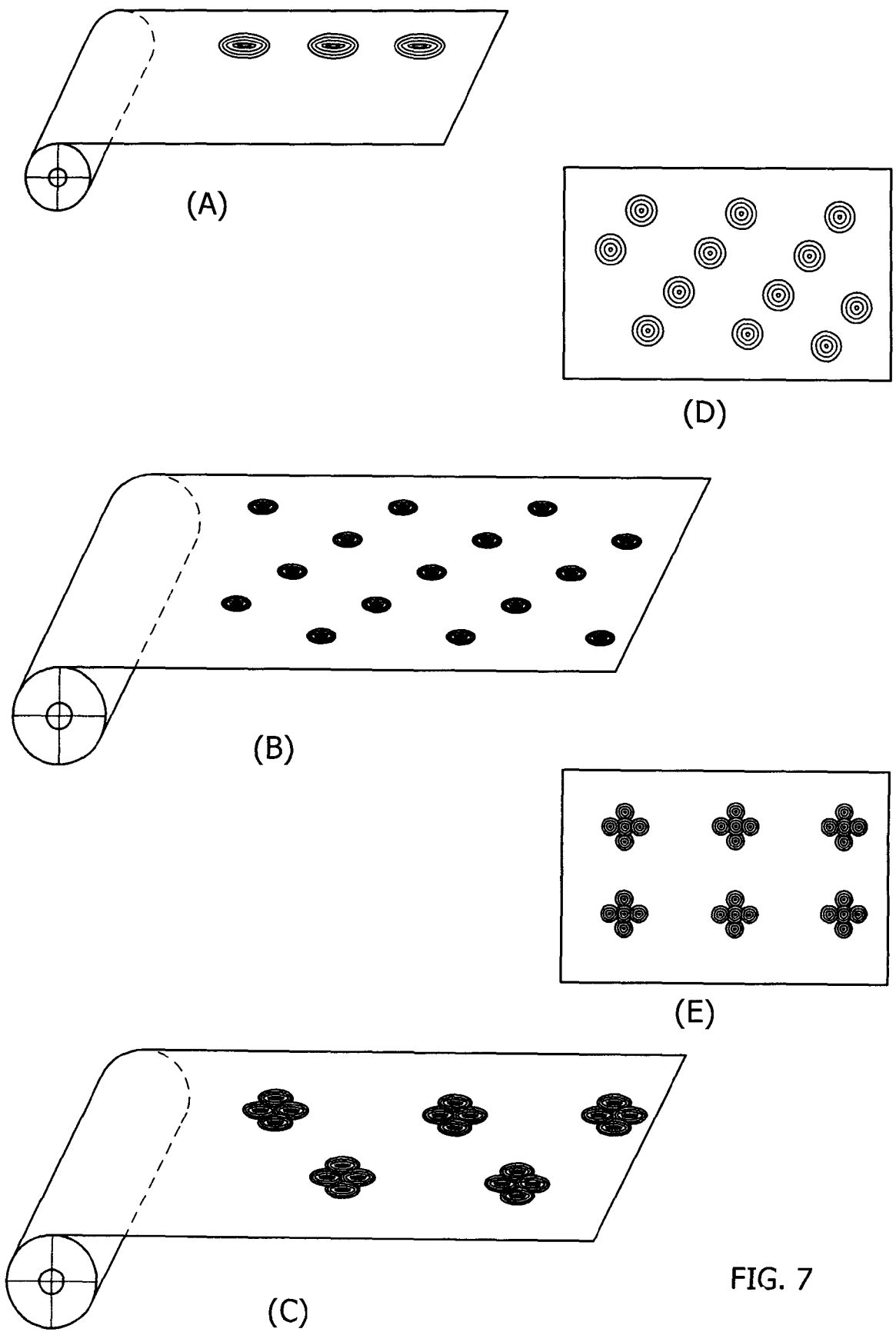
FIGS. 7A-7E illustrate various exemplary embodiments for providing the Fresnel lenses on a roll of substrate and/or individual substrate sheet in accordance with various embodiments of the present invention.

In an embodiment of the invention, the first surface (610a) of the reverse printed transparent polymeric film (610) may be laminated with a backing substrate (620) to protect/cover the reverse printing and the Fresnel lenses (602), as shown in FIGS. 6D-6E. It may be appreciated that the backing substrate (620) acts as a support & protection to the reverse printed transparent polymeric film (610), which can be single layer or multilayer or other suitable laminate structures.

A protective lacquer or UV/E-beam curable coating may also be provided over the first surface (610a) to cover and protect the reverse printing and Fresnel lenses (602).

It may be contemplated that the substrates/film (408, 610) with Fresnel lenses (410, 602) obtained by any of the processes as described herein may be further used to make various products like pouches, bags, sachets, display boards, wall/floor coverings, squeeze tubes of laminates and many other goods for packaging and other applications.

The foregoing descriptions of specific exemplary embodiments of the present invention have been presented for purposes of illustration and description only. They are not intended to be exhaustive or to limit the invention to the precise forms and sequence of steps disclosed, and obviously many modifications and variations are possible in light of the above teachings. The exemplary embodiments were chosen and described in order to explain certain principles of the invention and their practical application, thereby enabling others skilled in the art to make and utilize various exemplary embodiments of the present invention, as well as various alternatives and modifications thereof.

I claim:

1. A process for providing Fresnel lenses with well-defined edges on a flexible substrate, the process comprising:
   providing at least a Fresnel lens or a pattern of Fresnel lenses on a first surface of a first substrate; and
   laminating a reverse printed flexible transparent substrate over the Fresnel lenses on the first substrate, the reverse printed transparent substrate comprising a printed pattern on a printed surface of the reverse printed transparent substrate, the printed pattern comprising unprinted transparent windows and opaque surroundings of the unprinted transparent windows,
   wherein:
   the reverse printed polymeric film is laminated over the Fresnel lenses such that the unprinted transparent windows are duly registered with corresponding Fresnel lenses on the first substrate;
   the unprinted transparent windows are smaller than the corresponding Fresnel lenses, such that portions of the corresponding Fresnel lenses are visible through the unprinted transparent windows from a front side of the transparent flexible substrate opposite the printed surface, and such that irregular, uneven, or torn edges of the corresponding Fresnel lenses resulting from the providing of the Fresnel lenses on the first surface of the first substrate are hidden from view through the front side by the opaque surroundings of the unprinted transparent windows.

2. The process of claim 1, wherein the Fresnel lens or a pattern of Fresnel lenses are provided on the substrate by cast and cure method comprising:
   providing a substrate;
   coating the first surface of first substrate with a curable coating, the curable coating being capable of curing using a radiation;
   providing by embossing at least a Fresnel lens or predetermined pattern of Fresnel lenses, on the curable coated substrate; and
   curing the curable coating using the radiation.

3. The process of claim 2, wherein a selective portion of the surface of the first substrate is coated with the radiation curable coating registered or unregistered.

4. The method of claim 2, wherein a coating of primer is provided at least on the predetermined portion or under the predetermined shapes, before providing the array of predetermined shapes.

5. The process of claim 1, wherein the Fresnel lens or a pattern of Fresnel lenses are provided on the substrate by a process of hot or cold foil stamping.

6. The method of claim 1, wherein the predetermined portion of the Fresnel lenses is covered by providing predetermined shapes registered with the Fresnel lenses on the first substrate.

7. The process of claim 1, wherein predetermined shapes are provided by printing the predetermined shapes on Fresnel lenses.

8. The process of claim 1, wherein predetermined shapes in any color, holographic pattern, engraved pattern or having any other security feature or a combination thereof are provided by transferring the shapes by hot or cold foil stamping.

9. A process for providing Fresnel lenses on a transparent flexible substrate, the process comprising:
   reverse printing a pattern on a first surface of the transparent flexible substrate, the pattern comprising unprinted transparent windows and opaque surroundings of the unprinted transparent windows;
   transferring Fresnel lenses onto the first surface over and duly registered with corresponding unprinted transparent windows, the Fresnel lenses being larger than the corresponding unprinted transparent windows, such that portions of the Fresnel lenses are visible through the corresponding unprinted transparent windows from a front side of the transparent flexible substrate opposite the first surface, and such that irregular, uneven, or torn edges of the Fresnel lenses resulting from the transferring of the Fresnel lenses are hidden from view through the front side by the opaque surroundings of the unprinted transparent windows.

10. The process of claim 9, wherein the Fresnel lenses is transferred by UV/E-beam cast and cure method.

11. The process of claim 9, wherein the Fresnel lenses is transferred by hot/cold foil stamping.

12. The process of claim 9, wherein a backing substrate is optionally laminated with the reverse printed transparent substrate to protect/cover the reverse printing and the Fresnel lenses.

13. The process of claim 12, wherein the backing substrate is at least one of a suitable single or multilayer fibrous substrate.

14. Fresnel lenses on a flexible substrate prepared by the process of claim 9.

15. The process of claim 9, wherein the Fresnel lenses includes one or more Fresnel lenses, or a pattern of Fresnel lenses or row of the Fresnel lenses or an array of the Fresnel lenses or, a group or cluster of the Fresnel lenses; and wherein a protective lacquer or UV/E-beam curable coating is provided to protect/cover the printing and Fresnel lenses.

16. The process of claim 1 or 9, wherein the Fresnel lenses includes one or more Fresnel lenses, or a pattern of Fresnel lenses or row of the Fresnel lenses or an array of the Fresnel lenses or, a group or cluster of the Fresnel lenses.

17. The process of claim 1 or 9, wherein a protective lacquer or UV/E-beam curable coating is provided to protect/cover the printing and Fresnel lenses.

18. The process of claim 1 or 9, wherein the Fresnel lenses are metalized.

19. The process of claim 1 or 9, wherein a hologram or holographic pattern, engraved pattern or any security feature or in combination thereof is provided on the Fresnel lenses.

20. The process of claim 1 or 9, wherein a whole first surface of the substrate is metalized.

21. The process of claim 20, wherein the metalized first surface of the substrate is selectively demetalized excluding the Fresnel lenses.

22. The process of claim 20, wherein metallization is done with one selected from the group consisting of aluminum, nickel, copper, zinc sulphide, silicon oxide, aluminum oxide or one or more of silver, gold, copper or chrome or any such suitable metal or its compound or combination thereof.

23. The process of claim 20, wherein the metalized surface is provided with holograms, engraved patterns, or latent image at predetermined locations or all over.

24. The process of claim 1 or 9, wherein a predetermined portion of the substrate is metalized.

25. The process of claim 1 or 9, wherein the substrate is one of a single or multilayer fibrous substrate.

26. The process of claim 1 or 9, wherein the substrate includes one of paper or paperboard, coated or uncoated, woven or non-woven substrate of manmade fibers of natural or polymeric origin, film of PET or BOPP or any other suitable polymer or laminate.

27. The process of claim 1 or 9, wherein the substrate is made up of one of polyethylene (PE), polypropylene (PP), polyvinyl chloride (PVC), poly carbonate (PC), polyethylene terephthalate (PET), polyamide (PA), acrylonitrile butadiene styrene (ABS), ethylene vinyl acetate (EVA), or a combination thereof.

* * * * *